April 26, 1938.　　　G. W. McFARLANE　　　2,115,205
WELL SCREEN
Filed Aug. 7, 1936　　　2 Sheets-Sheet 1
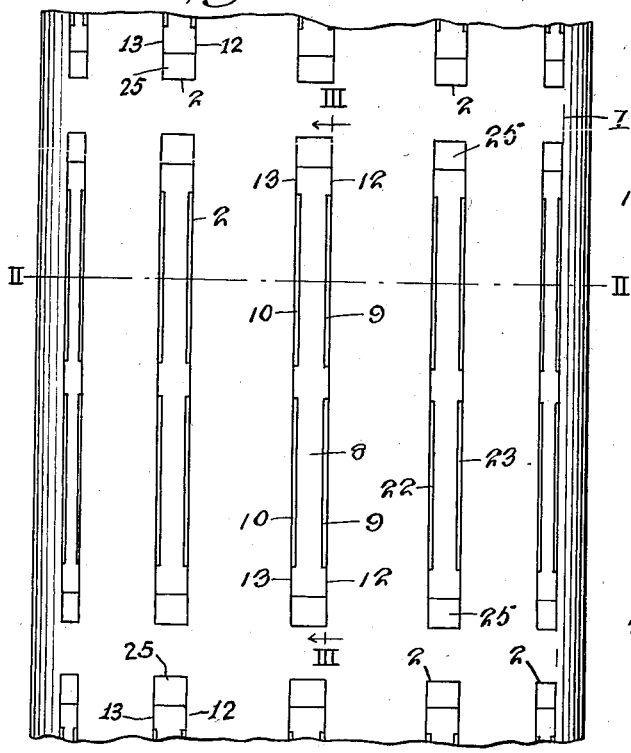
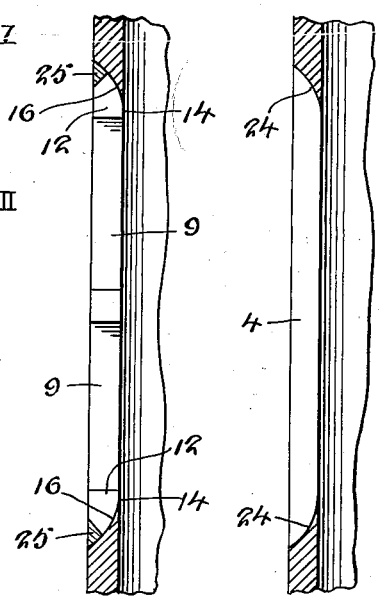
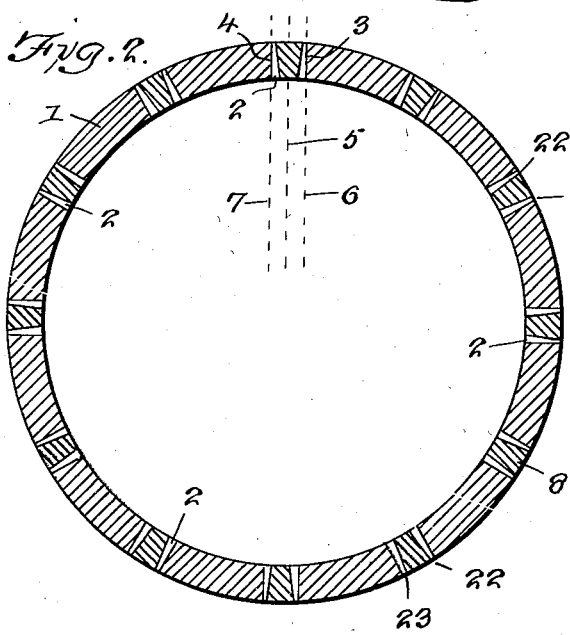
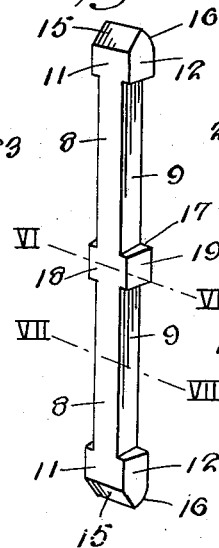
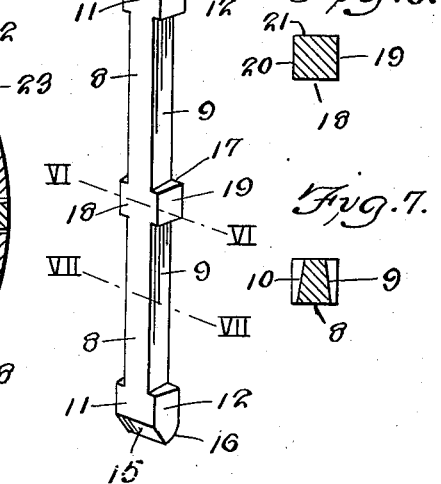
INVENTOR
George W. McFarlane
By Foster & Codier ATTORNEYS April 26, 1938.   G. W. McFARLANE   2,115,205
WELL SCREEN
Filed Aug. 7, 1936   2 Sheets-Sheet 2
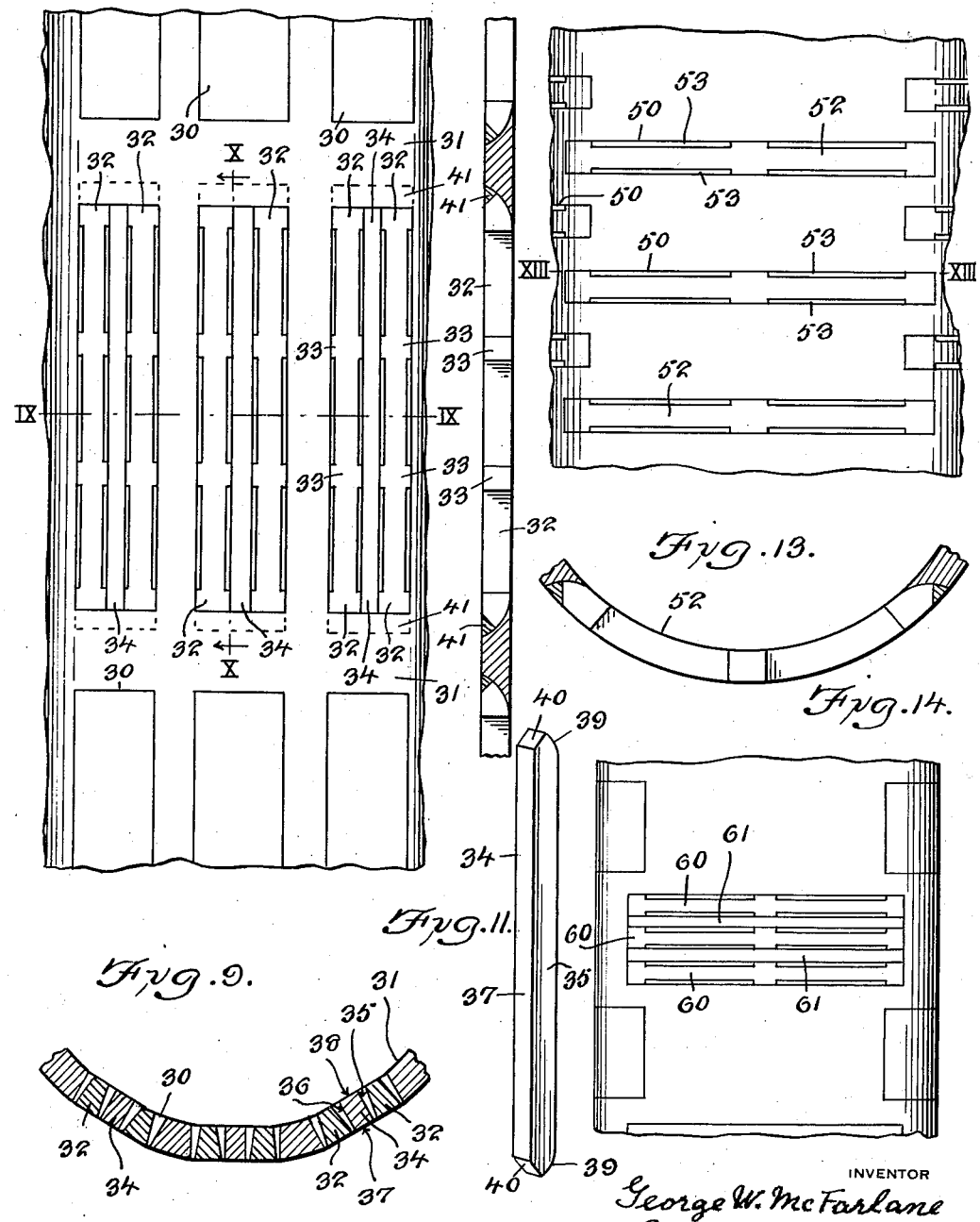

Patented Apr. 26, 1938

2,115,205

UNITED STATES PATENT OFFICE 2,115,205

WELL SCREEN

George W. McFarlane, Houston, Tex.

Application August 7, 1936, Serial No. 94,839

12 Claims. (Cl. 166—6)

The present invention relates to new and improved oil well or water well screens or strainers such as are usually applied at or near the lower end of the flow pipe of oil or water wells to separate solid matter from the fluids entering the flow pipe from the formations in the well.

An object of the invention is to produce a well screen from a slotted pipe and inlays for the slots with longer slots and longer inlays than has heretofore been thought possible, whereby the construction of a screen or strainer of this type is not only simplified but also rendered less expensive.

Another object of the invention is the production of a well screen from slotted pipes and inlays of the type referred to in the preceding paragraph in which external pressure tending to or causing the inlays to be pushed towards the interior of the pipe does not destroy the gauge of the screening slits.

A further object of the invention is the production of an improved well screen strainer element and combinations of strainer elements for use in making well screens of the type referred to above.

From the following detailed description of several variations or embodiments of the invention it will be seen how the above objects are accomplished.

Referring to the accompanying drawings, in which the same reference number in the various views indicates the same part or member, Fig. 1 is a side elevation of a short length of a well screen or strainer constructed according to the present invention;

Fig. 2 is a cross section on the line II—II of Fig. 1;

Fig. 3 is a cross section on the line III—III of Fig. 1, looking in the direction of the arrows applied to said line;

Fig. 4 is a longitudinal cross section of one of the slots taken along a line III—III of Fig. 1 but without the inlay in the slot, and looking in the direction of the arrows applied to said line;

Fig. 5 is a perspective view of one form of the inlays or bars which are secured in the slots;

Fig. 6 is a cross section on the line VI—VI of Fig. 5;

Fig. 7 is a cross section on the line VII—VII of Fig. 5;

Fig. 8 is a side elevation of a part of a well screen representing a modification of the invention;

Fig. 9 is a cross section on the line IX—IX of Fig. 8;

Fig. 10 is a cross section on the line X—X of Fig. 8, looking in the direction of the arrows applied to said line;

Fig. 11 is a perspective view of one of the inlays or bars used in constructing the modification illustrated in Figs. 8, 9, and 10;

Fig. 12 is a side elevation of a part of a well screen representing another modification of the invention;

Fig. 13 is a cross section on the line XIII—XIII of Fig. 12, looking in the direction of the arrows applied to said line; and Fig. 14 is a side elevation of a short length of well screen representing still another modification of the invention.

Referring to the embodiment of the invention illustrated in Figs. 1 to 7, inclusive, of the drawings, the numeral 1 designates a pipe provided with a plurality of distributed slots 2 passing through the wall or walls of the pipe. In Fig. 1 three rows of slots, arranged circumferentially of the pipe, are shown, the lowermost and uppermost rows being only partially shown. As many rows of slots as desired or necessary may be provided in the pipe, and the slots may be disposed in other relationship than in rows around the pipe. These slots have considerable length and must be of sufficient length to accommodate the long inlays or bars, one of which bars or inlays is shown in perspective in Fig. 5.

The side walls 3 and 4 of each slot (see Fig. 2) are preferably arranged parallel to each other, and each of the side walls of a slot are preferably arranged to be parallel with a plane passing through or containing the axis of the pipe and intersecting the outer circumference of the pipe midway between the side walls of the slot. In Fig. 2, the broken line 5 represents a section of the plane referred to and broken lines 6 and 7 respectively represent sections of planes representing respectively extensions of the side walls 3 and 4 of the slots 2. The slots in the modification of the invention illustrated in Figs. 8, 9, and 10 are preferably constructed or formed in the same way. In the modifications of the invention shown in Figs. 12 and 14, however, the side walls of the slots are parallel and are preferably in planes which, if extended across the pipe, would be normal to the axis of the pipe. The purpose of such preferred construction is given hereinafter.

In Fig. 5 is shown in perspective view one of the inlay or strainer elements adapted to fit and be secured within the slots 2 of the pipe 1. The inlay is tapered or wedge shaped in cross section as shown in Figs. 2, 5, and 7. As will be seen from Figs. 2, 5, and 7 the inlay comprises a top portion 8 and two sides 9 and 10 inclined towards each other to impart a tapered or wedge shaped cross section to the inlay or bar.

At each of the ends of the inlays is a head. These heads are similarly constructed. Each head comprises a top portion 11 of rectangular shape in the same plane as surface 8, two side portions 12 and 13 (see Figs. 1, 3, and 5), a bottom portion 14, a downwardly inclined surface 15, and an arcuate portion 16. The side portions 12 and 13 of each head extend outwardly from the inclined sides 9 and 10, forming bosses, shoulders, or spacing means to space the inlays or straining elements from the side walls of the slots or from some other similar surface.

Between the end heads of the inlays, and spaced from these heads, and preferably equidistant from the heads, is an enlargement indicated generally by the numeral 17. A cross section of this enlargement is shown in Fig. 6. This enlargement comprises a top portion 18, in the same plane as surface 8, two side portions 19 and 20 and a bottom portion 21. The side portions 19 and 20 extend outwardly from the inclined sides 9 and 10, forming bosses, or shoulders which serve as additional spacing means to space the inlays from either the side walls of the slots or from some other similar surface.

The side portions 12 and 13 of the heads of the inlays are parallel or substantially parallel; and the side portions 19 and 20 of the enlargement 17 are also parallel or substantially parallel. The dimensions of the heads and of the enlargements 17 of the inlays are such that the side portions 12, 13, 19, and 20 fit tightly or closely against the side walls of the slots 2, as shown in Fig. 1, when the inlays are inserted within the slots. If desired, the side portions 12, 13, 19, and 20 may be inclined inwardly a little towards each other to secure a wedging of the inlays in the slots 2 when the inlays are placed in the slots as shown in Figs. 1, 2, and 3.

The portions of the inlays between the heads, with the exception of the portions occupied by the enlargements 17, are narrower in width than the slots 2; that is to say, the width of the top 8 of each inlay shown in Fig. 5 is narrower than the width of each slot 2, in order to provide screening or straining slits 22 and 23, as shown in Figs. 1 and 2, when the inlays are placed in position in the slots 2. The side portions 12 and 13 of the heads at the ends of the inlays, and the side portions 19 and 20 of the enlargements on each side of the inlays, are extended out equal distances from the inclined sides 9 and 10; and by virtue of such construction the inclined walls 9 and 10 will be spaced equal distances from the side walls of the slots 2, or from adjoining plane surfaces. Thus the slits 22 and 23 on each side of an inserted inlay will have equal widths and these widths are determined by the extent the portions 12, 13, 19, and 20 are extended outwardly from the side portions 9 and 10.

Fig. 4 shows a longitudinal cross section of one of the slots without an inlay, bar or strainer element shown in Fig. 5, while Fig. 3 shows a longitudinal cross section of one of the slots 2 with an inlay shown in Fig. 5 secured in operative position. Referring to these figures, it will be noted that the inlays fit down into the slots with the arcuate portions 16 of each head abutting against a correspondingly shaped arcuate portion 24 at each end of the slot. The dimensions of the various parts are such that the top surface 8 becomes flush with the exterior surface of the pipe. The inlays are preferably electrically welded to the pipe in order to secure them in position. Such welds are preferably made over the inclined surfaces 15 at each end of the inlays and between such inclined surfaces and the pipe proper, molten metal from the welding operation being caused to fill the space above the inclined surfaces 15. These welds are indicated by the numeral 25 in Figs. 1 and 3. In addition to these welds between the ends of the inlays and the pipe at the ends of the slots, the enlargements 17 may also be electrically welded to the pipe on one or both sides of the enlargements. Instead of securing the inlays in position by welding, the inlays may be secured or held in position by soldering or brazing.

As will be clearly seen by an inspection of Fig. 2, the inlays are so positioned in the slots 2 that the tapered portions of the inlays are directed towards the interior of the pipe. Thus the screening or straining slits 22 and 23 constantly increase in width from the exterior surface of the pipe to the interior surface of the pipe. Such construction is to prevent or lessen clogging of the screening or straining slits.

Figs. 8, 9, and 10 illustrate a well screen or strainer showing the invention applied in somewhat different manner than illustrated in Figs. 1 to 7 inclusive. In Figs. 8, 9, and 10 the side and end walls of the slots 30 in the pipe 31 are made in the same manner as the side and end walls of slots 2 in Figs. 1 to 7 inclusive, but the slots 30 are made considerably wider than the slots 2 shown in Figs. 1 and 2. Inlays or strainer elements 32 illustrated in Figs. 8, 9, and 10 are constructed in the same manner as the inlay or strainer element shown in Fig. 5, except that two or more enlargements 33 (corresponding to enlargement 17 of Fig. 5) are provided in order to provide two or more sets of spacing bosses on each side of inlay 32. The distances between adjacent enlargements 33 and the distance between the head at each end and its nearest enlargement 33 are preferably equal, in order to provide a plurality of bosses or spacing means on each side of the inlay at regular and equal intervals. Such provision of a plurality of spacing means on each side of inlays 32 enables inlays of greater length than those shown in Fig. 5 to be used.

In Figs. 8 and 9 two inlays 32 are shown positioned and secured in the slots, but in this variation of the invention another straining or screening element 34 is placed between the inlays 32. The straining element 34 is illustrated in perspective in Fig. 11. It consists of a bar of uniform rectangular cross section having parallel side walls 35 and 36, top and bottom walls 37 and 38, arcuate portions 39 and slanting portions 40. The strainer element 34 has the same length from tip to tip as the strainer element 32 and the vertical distance from the top wall 37 to the bottom wall 38 is the same or about the same as the corresponding dimension of the inlay 32. The top wall 37 may be about the same width or a little narrower than the corresponding dimension of the inlay 32. The arcuate portions 39 and the slanting portions 40 have respectively the same curvature and inclination as corresponding portions on the inlays 32, so that when the inlays 32 are assembled with inlays 34 in the slots 30 in abutting relation, side to side, the inlays 34 will fit into the slots in the same manner as inlay 32 and provide a space for fused metal of the electrically produced weld 41 above the slanting portions 40 at the ends of the inlays 34. This electrically produced weld extends across and over the slanting portions of both inlays 32 and 34 as indicated by broken lines in Fig. 8. In Fig. 10 the fused metal of the weld 41 is shown above the slanting portion on an inlay 32. The inlays 32 may be further welded to the pipe 31 where the enlargements 33 make contact with the side walls of the slots 30.

From the foregoing it will be seen that the variation of the invention shown in Figs. 8, 9, and 10, provides a plurality of screening slits in each slot of the pipe 31. Referring to Figs. 8 and 9 it will be seen that screening slits are provided between each inlay 32 and the adjacent side wall of the slot and that screening slits are also provided between each inlay 32 and the adjacent wall of the inlay 34.

As heretofore indicated the inlays or solid strainer elements or bars, and the corresponding slots in which they fit and are secured, are considerably longer than heretofore thought practical or possible; and by the use of such relatively long inlays and slots, a well screen or strainer with the required effective screening area can be more readily and cheaply constructed. Without restricting the invention, however, to specific dimensions of the straight inlays or bar straining element shown in Figs. 5 and 8, 9 and 10, the said inlays may be from two to six inches in length, preferably about six inches in length, when the inlays are only welded at their ends; but if, additionally, the inlays are welded to the pipe at all the points where the intermediate bosses or spacing means make contact with the side walls of the slots, the length of the inlays can far exceed six inches or be of any desired length.

Figs. 12 and 13 illustrate still another variation of the invention. In this modification, the slots 50 are cut transversely of the pipe 51, the sides of the slots being parallel and in planes which are normal or approximately normal to the axis of the pipe. The inlays 52 are constructed in the same manner as the inlay shown in Fig. 5, except that they are arc shaped instead of straight as in Fig. 5, the curvature of the arc being the same as the curvature of the pipe, so that when the inlays are secured in position in the slots their exterior portions will be flush with the exterior portion of the pipe. The screening slits are indicated by the numeral 53.

Fig. 14 illustrates still another variation of the invention somewhat similar to the variation shown in Figs. 12 and 13. In this modification of the invention inlays 60 are identical with inlays 52 shown in Figs. 12 and 13; but between each pair of inlays 60 is placed an arcuate straining element 61 with plane parallel sides. The construction of strainer element 61 is the same as the strainer element shown in Fig. 14 except that it is shaped in the form of an arc of the same dimensions of strainer element 60, and both strainer elements 60 and 61 are of such dimensions that when positioned in the slots their outer curved surfaces are flush with the outer surface of the pipe.

In all variations of the invention using a plurality of inlays or straining elements, the inlays are placed side to side in abutting relation in the slot and completely fill the slots as shown, except for the screening slits. In all variations of the invention, the slots in the pipe may be arranged as shown or in any other desired or useful manner.

In the foregoing description it will be seen that the planes of the side walls of the slot occupy preferably a certain definite relationship to each other and the pipe; that the side walls of the slots 2 (see Fig. 2) are parallel with the plane of the longitudinal section of the inlays or bars 8; and that the side walls of the slots 30 (see Figs. 8 and 9) and the surfaces 35 and 36 of the inlays or bars 34 are also parallel to the plane of the longitudinal section of the inlays or bars 32. Owing to this indicated construction, any external pressure causing inlays 8 or 32 to be pushed radially inwardly of the pipe will not alter or destroy the width or gauge of the screening slits.

It is to be understood that the heads at the ends of the inlay or screening element shown in Fig. 5, the heads at the ends of the inlays or screening elements 32, 52, and 60 shown respectively in Figs. 8, 12, and 14, and the enlargements 17 and 33, or their bosses, are relatively small or short as compared with the length of the wedge shaped or tapered portion of the inlay, whereby screening slits of great longitudinal dimenstions are attainable.

The inlays or screening elements, as well as the pipe in which they are positioned, may be constructed of any suitable or appropriate metal, such as steel, brass, stainless steel, or other metal or alloy suited to meet the requirements of the oil field or formations in which the screen or screens are intended to be used.

I claim:

1. A well screen or strainer comprising a tubular body having a slot establishing communication between the exterior and interior of said tubular body through the wall of said tubular body, an inlay secured longitudinally in said slot and defining screening slits on each side of it between it and the side walls of the slot, spacing means for each side of the inlay near each end and additional spacing means for each side of the inlay between said first mentioned spacing means, said spacing means spacing said inlay from each side wall of said slot to define said screening slits between said inlay and the sides of said slot.

2. A well screen or strainer comprising a tubular body having a slot establishing communication between the exterior and interior of said tubular body through the wall of said tubular body, the side walls of said slot being substantially parallel, a bar narrower than said slot extending longitudinally in said slot, spacing means for each side of said bar near each end and spacing means for each side of said bar between said first mentioned spacing means and spaced therefrom longitudinally of the said bar, said spacing means spacing said bar from each side of said slot to define screening slits between said bar and the sides of said slot.

3. A well screen or strainer comprising a tubular body having a slot establishing communication between the exterior and interior of said tubular body through the wall of said tubular body, the side walls of said slot being substantially parallel, an inlay of tapered cross section secured in said slot longitudinally thereof, the tapered portion of said inlay being directed towards the interior of the tubular body, spacing means for each side of said inlay near the ends and between the ends for spacing said inlay on each side from the side walls of said slot to define screening slits between said inlay and the side walls of said slot.

4. A well screen or strainer comprising a tubular body having a slot establishing communication between the exterior and interior of said tubular body through the wall of said tubular body, said slot having side walls approximately parallel with a plane passing through the axis of the tubular body and intersecting the outer circumference of the tubular body midway between the side walls of said slot, a bar, narrower than said slot, secured in said slot and extending lengthwise thereof, the said bar being so positioned in said slot to define a screening slit on each side of said bar between said bar and the adjacent side wall of said slot, means on opposite sides of the bar near each end of said bar to space the bar from the walls of the said slot and means on opposite sides of the bar between the ends of the bar and spaced therefrom to space said bar from the side walls of said slot at a point between the ends of the bar.

5. A well screen or strainer comprising a tubular body having a slot passing through the wall thereof, a bar secured longitudinally in said slot and spaced from the side walls of said slot to form a screening opening on each side of said bar between said bar and the side walls of the said slot, said bar having means laterally thereof extending towards the side walls of said slot and spacing said bar from the side walls of said slot.

6. A well screen or strainer comprising a tubular body having a slot establishing communication between the exterior and interior of said tubular body through the wall of said tubular body, a plurality of inlays secured longitudinally in said slot, each of said plurality of inlays being provided with means to space it laterally from an adjacent inlay, and an inlay devoid of spacing means thereon, secured longitudinally in said slot between and adjacent said plurality of inlays with spacing means.

7. A well screen or strainer comprising a tubular body having a slot establishing communication between the exterior and interior of said tubular body, a plurality of inlays secured longitudinally in said slot, each of said plurality of inlays being provided with means to space it laterally from an adjacent inlay, and an inlay with parallel side walls secured longitudinally in said slot between and adjacent said first mentioned inlays, with the said parallel side walls adjacent spacing means on said first mentioned inlays.

8. A well screen or strainer comprising a tubular body having a slot establishing communication between the exterior and interior of said tubular body through the wall of said tubular body, a plurality of inlays secured longitudinally in said slot, each of said plurality of inlays having spacing means for each side of it near each end and additional spacing means for each side of it between and spaced from said first mentioned spacing means, and an inlay, devoid of spacing means thereon, secured longitudinally in said slot between and adjacent said plurality of inlays with spacing means.

9. A well screen or strainer comprising a tubular body having a slot establishing communication between the exterior and interior of said tubular body through the wall of said tubular body, a plurality of inlays secured longitudinally in said slot, each of said plurality of inlays having spacing means for each side of it near each end and additional spacing means for each side of it between and spaced from said first mentioned spacing means, and an inlay with parallel side walls secured longitudinally in said slot between and adjacent said first mentioned inlays, with the said parallel side walls adjacent spacing means on said first mentioned inlays.

10. A well screen or strainer comprising a tubular body having a slot establishing communication between the exterior and interior of said tubular body through the wall of said tubular body, a plurality of inlays secured longitudinally in said slot, each of said plurality of inlays being tapered towards the interior of said tubular body and having spacing means for each side of it near each end and additional spacing means for each side of it between and spaced from said first mentioned spacing means, and an inlay with parallel side walls secured longitudinally in said slot between and adjacent said first mentioned inlays, with the said parallel side walls adjacent spacing means on said first mentioned inlays.

11. A well screen or strainer comprising a tubular body having an opening therein establishing communication between the exterior and interior of said tubular body through the wall of said tubular body, a bar having longitudinal side walls inclined towards each other within said opening, said bar being secured between two surfaces within said opening which are substantially parallel with each other, said longitudinal side walls of said bar being spaced from said surfaces to form screening slits between the longitudinal side walls of said bar and said surfaces, means carried by said bar spacing it from said surfaces, and said surfaces being substantially parallel with the plane of the longitudinal section of said bar.

12. A well screen or strainer comprising a tubular body having an opening therein establishing communication between the exterior and interior thereof through the wall of said tubular body, a bar having two longitudinal sides inclined towards each other within said opening, a second bar within said opening with a longitudinal side wall disposed near one of the inclined sides of said first mentioned bar and spaced therefrom to form a screening slit, spacing means on said first mentioned bar spacing said bars apart and determining the width of said screening slit, the said longitudinal side of said second mentioned bar being substantially parallel with the plane of the longitudinal section of said bar.

GEORGE W. McFARLANE.